United States Patent
Slat et al.

(10) Patent No.: US 6,461,699 B1
(45) Date of Patent: *Oct. 8, 2002

(54) PLASTIC CONTAINER HAVING A CARBON-TREATED INTERNAL SURFACE FOR NON-CARBONATED FOOD PRODUCTS

(75) Inventors: William A. Slat, Brooklyn, MI (US); Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 71 days.

This patent is subject to a terminal disclaimer.

(21) Appl. No.: 09/680,688

(22) Filed: Oct. 6, 2000

(51) Int. Cl.[7] .................. B29D 22/00; B29D 23/00; B32B 1/08; B65D 23/00; A47J 41/02
(52) U.S. Cl. .................. 428/35.7; 428/36.6; 428/36.7; 428/500; 428/515; 428/516; 215/12.1; 215/12.2
(58) Field of Search .................. 428/35.7, 36.6, 428/36.7, 500, 515, 516; 215/12.1, 12.2, 373

(56) References Cited

U.S. PATENT DOCUMENTS

| | | | |
|---|---|---|---|
| 4,756,964 A | * | 7/1988 | Kincaid et al. ............. 428/408 |
| 5,464,106 A | * | 11/1995 | Slat et al. ................ 215/12.1 |
| 5,565,248 A | | 10/1996 | Plester ....................... 427/571 |
| 5,677,010 A | | 10/1997 | Esser et al. ............... 427/489 |
| 5,690,745 A | | 11/1997 | Grunwald et al. .......... 128/723 |
| 5,693,283 A | * | 12/1997 | Fehn ........................... 264/513 |
| 5,849,366 A | | 12/1998 | Plester ....................... 427/491 |

FOREIGN PATENT DOCUMENTS

| | | |
|---|---|---|
| EP | 0575299 | 12/1993 |
| EP | 0773166 | 5/1997 |
| FR | 2776540 | 10/1999 |

* cited by examiner

*Primary Examiner*—Harold Pyon
*Assistant Examiner*—Michael C. Miggins
(74) *Attorney, Agent, or Firm*—Bachman & LaPoint, P.C.

(57) ABSTRACT

A container, desirably blow molded or extrusion molded, said container having barrier properties and including an upper wall portion having an opening, an intermediate sidewall portion positioned beneath the upper wall portion, and a base portion positioned beneath the intermediate sidewall portion to support the container. The container includes a molded first layer having an inner surface and an outer surface formed from high density polyethylene, and a carbon coating formed on the inner surface of the first layer and adhered thereto and substantially coextensive with the first layer, wherein said carbon coating has a thickness of less than about 10 microns.

28 Claims, 4 Drawing Sheets

PLASTIC CONTAINER HAVING A CARBON-TREATED INTERNAL SURFACE FOR NON-CARBONATED FOOD PRODUCTS

TECHNICAL FIELD

The present invention relates to plastic containers, preferably for non-carbonated food products, based on high density polyethylene (HDPE). More particularly, the present invention relates to molded plastic containers based on HDPE, having barrier properties and having a carbon-coated internal surface.

BACKGROUND ART

It is highly desirable to provide plastic containers having barrier properties, and it is also highly desirable to provide plastic containers using HDPE. HDPE is more like a regular crystal than the amorphous tangle of the polymer chains in low density polyethylene (LDPE). Also, HDPE is stronger and stiffer than LDPE. However, HDPE generally does not have barrier properties and has poor oxygen permeation rates. Therefore, despite the economic desirability of using HDPE, the use of such material has not been practical.

It would be particularly desirable to use HDPE for containers for non-carbonated food products, as beverages, due to its low cost and desirable properties if one could devise an effective and low cost way of overcoming the high porosity of this material.

Multi-layer plastic containers are commonly used for packaging items in a wide range of fields, including food and beverage, medicine, health and beauty, and home products. Plastic containers are known for being easily molded, cost competitive, lightweight, and generally suitable for many applications. Multi-layered containers provide the benefit of being able to use different materials in each of the layers, wherein each material has a specific property adapted to perform a desired function.

Because plastic containers may permit low molecular gases, such as oxygen and carbon dioxide, to slowly permeate through their physical configurations, the use of plastic containers sometimes proves to be less desirable when compared to containers formed from other less permeable materials, such as metal or glass. In most applications, the shelf life of the product contents is directly related to the package's ability to effectively address such molecular permeation. In the case of non-carbonated beverages, such as juices, oxygen in the atmosphere surrounding the container can gradually permeate inwardly through the plastic walls of the container to reach the inside of the container and deteriorate the contents. A highly porous container such as HDPE can permit rapid deterioration of the flavor of the container contents.

To address some to the foregoing concerns, plastic container manufacturers have utilized various techniques to reduce or eliminate the absorption and/or permeability of such gases. Some of the more common techniques include: increasing the thickness of all or portions of the walls of the container; incorporating one or more barrier layers into the wall structure; including oxygen-scavenging or reacting materials within the walls of the container; and applying various coatings to the internal and/or external surface of the container. However, a number of conventional barrier and/or scavenger materials will not effectively curtail permeation through a highly porous container wall, especially over extended periods of time. Moreover, there are usually other practical concerns associated with most conventional techniques, most commonly, increased material costs and/or production inefficiencies.

In recent times, the use of plastics has become a significant social issue. Recycling has become an increasingly important environmental concern and a number of governments and regulatory authorities continue to address the matter. In a number of jurisdictions, legislation pertaining to the collection, return, and reuse of plastic containers has either been considered or has already been enacted.

Moreover, HDPE is a particularly desirable material, especially for non-carbonated food products, as beverages, due to its desirable properties. For example, it has high strength and is of low cost. It can be readily used with color concentrates to provide an attractive colored product which will also reduce or eliminate the harmful effects of ultraviolet light. Moreover, it can be effectively used with a wide variety of color concentrates. It has good processability and good shrinkage properties.

Therefore, a need exists in the industry and it is an object of the present invention to provide a plastic container based on HDPE especially a container that is suitable for holding non-carbonated beverages, such as juices, and provide an acceptable level of performance when compared to commercial containers formed from alternative materials. A further need exists for a method to produce such containers in high volume commercial rates using conventional equipment.

It is a still further object of the present invention and need to provide a container based on HDPE which has barrier properties and which minimizes or avoids the high cost of inconvenience of conventional multi-layer plastic containers. It is a still further objective to do this at a reasonable cost, in a commercially feasible process, and with an effective product.

SUMMARY OF INVENTION

It has been found that the foregoing objects and advantages are readily obtained in accordance with the present invention.

Recognizing the problems and concerns associated with conventional multi-layered plastic containers, especially those used to hold non-carbonated food products, especially beverages, a plastic container having enhanced gas barrier properties and based on HDPE is advantageously provided. A container constructed in accordance with the principles of the present invention provides several advantages over those previously available. Such advantages are generally realized through the use of the desirable HDPE and a carbon coating on the internal surface of the container. It is a significant advantage that the container of the present invention desirably may also include oxygen scavengers and may have a multi-layered configuration. Furthermore, the improved container can be produced using conventional processing techniques and manufacturing equipment.

An important aspect of the present invention is the effective barrier properties of the present container with the functional and commercial benefits associated with having a container including the desirable HDPE. Further, the ease in subsequently recycling a container produced in accordance with the principles of the present invention make the practice of the invention extremely advantageous. Moreover, the present invention provides the additional advantage of permitting the manufacturer to controllably vary the material positioning and wall thickness at any given location along the vertical length of the inner and/or outer layers of the container.

In accordance with the principles of the present invention, a container is provided which is particularly suitable for non-carbonated food products, as beverages, which may be blow molded or extrusion molded, having an upper wall portion, an intermediate sidewall portion positioned beneath the upper wall portion, and a base portion positioned beneath the intermediate sidewall portion, the base portion being adapted to dependently or independently support the container. The container includes a molded first layer having an inner surface and an outer surface formed from high density polyethylene and a carbon coating formed adjacent and desirably on the inner surface of the first outer layer and adhered thereto and substantially coextensive with the first layer. In a preferred embodiment, the thickness of the first layer is controllably adjusted along its vertical length. If desirable, the first layer may also include additional barrier materials and/or oxygen scavenging/reacting materials incorporated therein.

In accordance with the principles of the present invention, the container may include a second layer adjacent the first layer, wherein the second layer is adjacent at least one of the inner surface of the first layer and the outer surface of the first layer, to provide a highly desirable, multi-layered container.

The HDPE used in the present invention has a density above about 0.940 grams/cc.

The container of the present invention is particularly suitable for use with non-carbonated products as food products, but may also be used for products which advantageously include the injection of gases therein, as $CO_2$ or nitrogen.

Other and further advantages and novel features of the invention are readily apparent from the following detailed description of the best mode for carrying out the invention when taken in connection with the accompanying drawings, wherein, by way of illustration and example, embodiments of the present invention are disclosed.

BRIEF DESCRIPTION OF THE DRAWINGS

The present invention will be more readily understandable from consideration of the accompanying drawings, wherein.

DETAILED DESCRIPTION OF PREFERRED EMBODIMENTS

Figure 1:
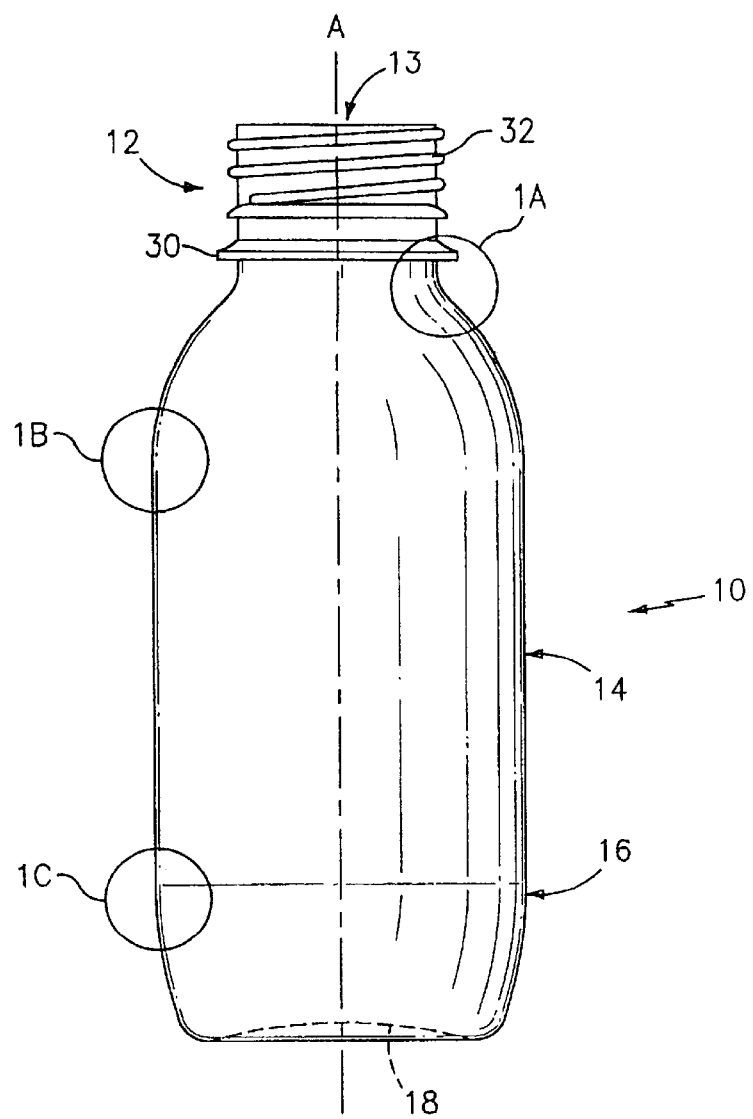
FIG. 1 is an elevation view of a container in accordance with the principles of the present invention.

Referring now to the drawings in detail, wherein like reference numerals and letters designate like elements, there is shown in FIG. 1 an elevational view of a container 10 constructed in accordance with the principles of the present invention. Container 10 typically includes an upper wall portion 12, including an opening 13; an intermediate sidewall portion 14 positioned beneath the upper wall portion 12; and a base portion 16 positioned beneath the intermediate sidewall portion 14. The base portion 16 is adapted to support the container 10 either dependently, i.e., where another object such as a base cup (not shown) is used, or independently, i.e., where no other objects are needed to stand the container upright on a generally flat surface. In a preferred embodiment, the container 10 is supported by a freestanding base formed by an internal depression 18 as those illustrated in FIG. 1, although other base configurations known in the art may be used.

Figure 1A:
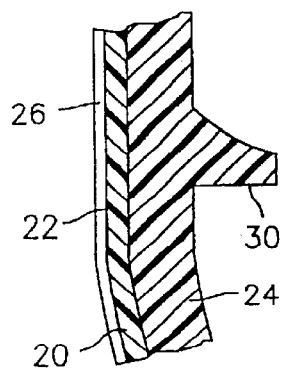
FIGS. 1A, 1B and 1C are cross-sectional and enlarged views of various areas of the container wherein the relative thicknesses of the layers forming the container are illustrated.
Figure 1B:
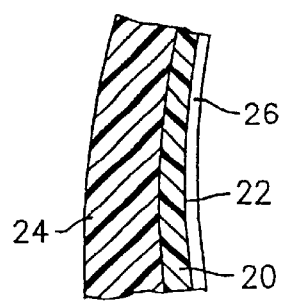
Figure 1C:
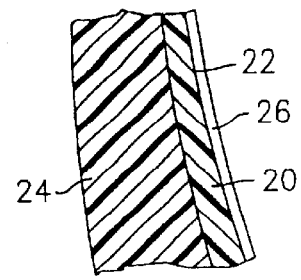

Referring to FIGS. 1A–1C, which represent enlarged detailed views of areas 1A, 1B and 1C, respectively, of FIG. 1, the container 10 includes (a) a molded inner layer 20, having a vertical length and an inner surface 22; (b) a molded outer layer 24; and (c) a central vertical axis A. The inner surface 22 of the molded inner layer 20 is at least partially coated with a thin layer or film of carbon 26. While complete encapsulation of the inner layer 20 by the outer layer 24 is not required, it is preferred that the molded outer layer 24 is substantially coextensive with the inner layer 20 and provides structural support to the walls of the container 10.

The molded inner layer 20 is comprised of a thermoplastic material. The following resins may be used as plastic materials for the inner layer 20: polyethylene resin, polypropylene resin, polystyrene resin, cycloolefine copolymer resin, polyethylene terephthalate resin, polyethylene naphthalate resin, ethylene-(vinyl alcohol) copolymer resin, poly-4-methylpentene-1 resin, poly (methyl methacrylate) resin, acrylonitrile resin, polyvinyl chloride resin, polyvinylidene chloride resin, styrene-acrylo nitrile resin, acrylonitrile-butadiene-styrene resin, polyamide resin, polyamideimide resin, polyacetal resin, polycarbonate resin, polybutylene terephthalate resin, ionomer resin, polysulfone resin, polytetra fluoroethylene resin and the like. When food product contents are involved, the inner layer 20 is preferably formed from virgin polyethylene terephthalate (PET), polyethylene naphthalate (PEN), and/or blends of polyethylene terephthalate and polyethylene naphthalate. However, other thermoplastic resins, particularly those approved for contact with food products, may also be used.

The molded outer layer 24 is comprised of HDPE and provides the main bulk of the container.

In a preferred embodiment, the inner layer 20 has a wall thickness, taken along its vertical length, that is in the range of 0.5 mil to 5 mil (0.0127 mm to 0.127 mm) and more preferably between 1 to 2 mils (0.0254 mm to 0.0508 mm). As illustrated in FIG. 1 and FIGS. 1A, 1B and 1C, the thickness of the inner layer may be varied along the vertical length. In this manner, different portions of the container 10 can have variably controlled thickness along the vertical length, providing improved material usage and increased design flexibility. For instance, the thickness of the inner layer 20 positioned at the upper portion 12 (such as shown in FIG. 1A) can be thinner than the intermediate sidewall portion 14 (such as shown in FIG. 1B). Likewise, the thickness of the inner layer 20 at the base wall portion 16 (such as shown in FIG. 1C) can be thicker than the thickness of the same layer in the intermediate sidewall portion 14 (such as shown in FIG. 1B).

In keeping with an aspect of the present invention, the inner layer comprises less than 0.60 by weight of the total weight of the container 10, preferably less than 0.30 of the total weight of the container 10, and more preferably, less than about 0.15 of the total weight of the container 10. The ability of the present invention to utilize an exceptionally thin inner layer 20—particularly when compared to other conventional multi-layer containers—can provide significant economic advantages and incentives in the present invention where the bulk of the container is made of the inexpensive HDPE.

As mentioned earlier, the inner surface 22 of the inner layer 20 is coated with a thin layer of carbon 26 which provides enhanced barrier properties to the container 10. In a preferred embodiment, the carbon coating 26 is comprised of a highly hydrogenated amorphous carbon that is doped with nitrogen. The thickness of the carbon coating 26 is less than about 10 μm and the weight of the coating 26 is less than about $1/10,000^{th}$ of the total weight of the container. An important feature of the present invention is than only about 3 mg of the carbon coating 26 is needed to treat a 500 cc plastic container. Further, despite the notable thinness of the carbon coating 26, the amount of barrier protection afforded is quite significant and the protection from permeation of oxygen and carbon dioxide is favorable when compared with the protection found in metal cans and glass bottles.

The molded outer layer 24 of HDPE comprises at least about 0.40 by weight of the total weight of the container 10, but can comprise more than 0.90 by weight of the total weight of the container 10 if desired. In a preferred embodiment, the outer layer 24 has a wall thickness, taken along its vertical length, that is in the range of 6 to 23 mils (0.1524 mm to 0.5842 mm). As illustrated in FIG. 1 and FIGS. 1A, 1B and 1C, the thickness of the outer layer can also be separately and independently varied along its vertical length. In this manner, different portions of the container 10 (taken perpendicular to the central vertical axis A) can have different inner layer thicknesses, different outer layer thicknesses, and/or different overall thickness measurements, all by design. For instance, the thickness of the molded outer layer 24 positioned at the upper portion 12 (such as shown in FIG. 1A) can be much thicker than the intermediate sidewall portion 14 (such as shown in FIG. 1B). Likewise, the thickness of the outer layer 24 at the base wall portion 16 (such as shown in FIG. 1C) can be thicker than the thickness of the same layer in the intermediate sidewall portion 14 (such as shown in FIG. 1B). Because the molded outer layer 24 is comprised of the less expensive HDPE material that does not directly contact the contents of the container 10, a less expensive material can be used to form a number of the structural integral components for the container, such as the neck flange 30 and outer threads 32 shown in FIG. 1 and FIG. 1A.

While it is often unnecessary, and can complicate the recycling process, in special applications, the inner layer 20 and/or outer layer 24 may further include additional barrier materials and/or oxygen scavenging/reacting materials (not shown) that are commonly known in the art. Examples of some of the more commonly used barrier materials include saran, ethylene vinyl alcohol copolymers (EVOH), and acrylonitrile copolymers, such as Barex. The term saran used in its normal commercial sense to contemplate polymers made for example by polymerizing vinylidene chloride and vinyl chloride or methyl acrylate. Additional monomers may be included as is well known. Vinylidene chloride polymers are often the most commonly used, but other oxygen barrier materials are well known. Oxygen-scavenging materials can include materials marketed for such a purpose by several large oil companies and resin manufacturers. A specific example of such a material is marketed under the trade name AMOSORB and is commercially available from the Amoco Corporation.

Another significant advantage of the present invention is its ability to provide significant barrier properties, incorporate a high content of the desirable HDPE material, and be advantageous to present day recycling. The inner layer 20 and outer layer 24 are both comprised of plastic material and can be readily recycled. Unlike a number of other barrier materials often used in connection with multi-layer containers, which can be difficult to separate, the carbon coating 26 of the present invention has no impact on the recycling of the plastic materials of which the container 10 is comprised.

The present invention includes the additional advantage of being able to provide a container 10 with enhanced barrier properties that can be used for holding food products. Plastic containers having an inner surface treated with an amorphous carbon film have been approved for contact with food products from the Technische National Onderzoek, the standards organization accredited by the European Economic Community. The approval of the United States Food and Drug Administration (USFDA) is currently in process.

The container 10 of the present invention may be formed by any of several known processing techniques which permit the manufacture of a multi-layer molded container 10 having a plastic molded inner layer 20 and a relatively thick molded outer layer 24 of HDPE plastic. The container may advantageously be prepared by extrusion molding or blow molding. In one embodiment, the multi-layer container 10 is formed via a blow molding operation involving a multi-layer preform 34, such as the one generally depicted in FIG. 2. Although not a required feature, the preform 34 may include a neck flange 30 (for handling purposes) and outer threads 32 (to secure a closure) that correspond to the same features shown in FIG. 1. After the blow molding of the container 10, as shown in FIG. 1, but some time before the filling operation, the inner surface 22 of the inner layer 20 of the container 10 is carbon-treated as further discussed below.

Figure 2:
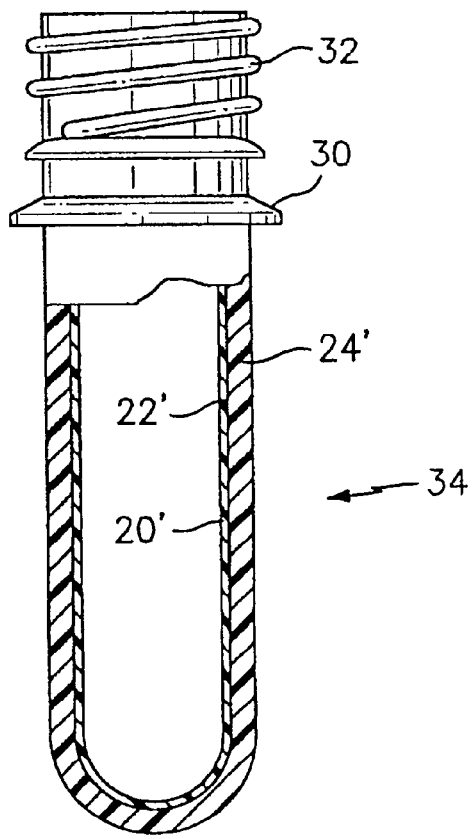
FIG. 2 is a partially broken away elevation view of one examples of a multi-layer preform.

In a first embodiment, as shown in FIG. 2, a preform 34 or final container is produced by extrusion molding an inner layer 20' having an inner surface 22' thereof and injection molding an outer layer 24'. The inner layer 20' and outer layer 24' of the preform 34 correspond to the inner layer 20 and outer layer 24 of the container 10. Extrusion of the inner layer 20' of the preform allows the manufacturer to produce a thinner layer than is generally possible using conventional injection molding or co-injection processes. For example, the inner layer of an extrusion molded multi-layer preform 34 may be made as thin as 15–20 mils (0.381 mm to 0.508 mm) or less. Conversely, it is difficult, if not impossible, to reliably injection mold an inner layer having a comparable thickness profile. Further, an extrusion or co-extrusion process permits the manufacturer to readily vary the thickness of material being extruded along the length of the extrudate. Variations in the thickness of the inner layer is desirable for several reasons which include aesthetics, efficient material use and reduced costs, and variable strength requirements.

The outer layer 24' of the preform 34 is formed from HDPE and, in accordance with the present invention, is substantially thicker than the inner layer 20'. The outer layer 24' can be injection molded or compression molded or co-extruded over the inner layer 20'. Such over-molding processes further permit the formation of a neck flange 30 and outer threads 32.

Figure 3:
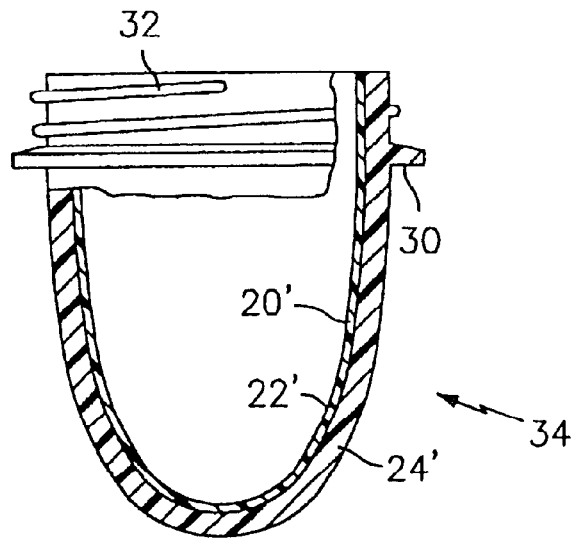
FIG. 3 is a partially broken away elevation view of another example of a multi-layer preform.

In a second embodiment shown in FIG. 3, a multi-layer preform 34 is produced by thermoforming a thin sheet of plastic material and forming that sheet into what will become the inner layer 20' having an inner surface 22' thereof of the preform 34. The process of thermoforming permits the formation of a preform 34 with a very thin inner layer 20'. In fact, minimum wall thicknesses of 3 mil (0.0762 mm) or less are possible. As in the case of an extruded inner layer 20', once the inner layer 20' of the preform 34 is formed, the outer layer 24' of recycled plastic can be injection or compression molded over the inner layer 20' to provide a multi-layer preform 34. FIG. 3 is a representative example of a preform 34 formed with a thermoformed inner layer 20' and injection molded outer HDPE layer 24'.

A multi-layer container can then be blown using conventional blow molding operations, or a co-extruded final container directly obtained. Because the preform 34 will be stretched and "thinned-out" during a subsequent blow molding process, the thickness of the preform 34, at portions corresponding to like portions of the blown container, will inherently be somewhat thicker. In fact, the thickness of the various portions of the preform 34 are typically designed to take into account the amount of stretch and hoop expansion necessary to form the thickness profile desired in the final container 10. For clarity, hereinafter, the multi-layer containers having inner and outer layers 20, 24 that have not been carbon-treated should be distinguished from containers 10 in which the inner surface 22 has been carbon coated.

After a container having an inner layer 20 and outer layer 24 are produced, a carbon coating is formed on at least a portion of the inner surface 22 of the inner layer 20. The carbon coating 26 does not have to be immediately applied to the container, however, it is generally more efficient to apply the coating 26 promptly after the container has been blown and is within an appropriate temperature profile.

In a preferred embodiment, the multi-layer containers are removed from a conventional high-speed rotary molding machine and subsequently transferred, directly or indirectly (i.e., via an intermediate handling step), to an apparatus for applying a carbon coating 26 to the containers. In high-speed production applications, the carbon-coating apparatus will typically also be of the rotary type. An example of such an apparatus that can be used to apply the carbon coating to the inner surface 22 of the container 10 is available from Sidel of Le Havre, France and is commercially marketed under the "ACTIS" trade name.

A method for carbon-coating multi-layer containers 10 is next described in further detail. In accordance with a preferred method for carbon coating the inner surface 22 of the container 10, a conventional carbon-coating or carbon-treating apparatus having rotary kinematics and a central vertical axis is provided. The carbon-coating apparatus generally rotates about its central vertical axis in a first rotational direction, e.g., counterclockwise, at a fairly high rotational speed. A blow-molding machine, or other rotary container transfer mechanism, located generally in close proximity to the carbon-coating apparatus functions as the source of containers for subsequent carbon-coating treatment. To facilitate the transfer, the rotary container transfer mechanism rotates in a direction opposed to the rotational direction of the carbon-coating apparatus, e.g., clockwise, and the multi-layer containers 10 are mechanically shifted from the container transfer mechanism to the carbon-coating apparatus. Although not required for the practice of the present invention, the container 10 preferably includes a neck flange 30 or other physical means for at least partially supporting the container 10 during the mechanical transfer process.

As the containers 10 are transferred from the transfer mechanism to the carbon-coating apparatus, the containers 10 are preferably held by the upper portion 12 in an upright orientation with the opening 13 generally facing upwardly. If desired, a vacuum can also be generated and used to support or partially support the container 10. During the transfer process, the individual containers 10 are received by a receiving mechanism which is part of the carbon-coating apparatus. The receiving mechanism revolves around the central axis of the carbon-coating apparatus, grasps or secures the container, and seals the opening 13 of the upper portion 12 of the container, much like a lid. When properly positioned over and abutting the opening 13, the receiving mechanism produces a tight to "airtight" seal over the container.

The receiving mechanism includes at least two apertures positioned above the opening 13 of the container that are used for the introduction and removal of gases from the inside of the container. A first aperture in the receiving mechanism is in communication with a vacuum source, such as a vacuum pump. After the receiving mechanism has securely sealed the opening 13, the air within the container is discharged through the first aperture by means of a vacuum. It is desirable that degree of vacuum falls within a range of about $10^{-2}$ to $10^{-5}$ torr, so as to shorten the discharge time for a vacuum and saves necessary energy therefor. With a lower degree of vacuum of over $10^{-2}$ torr, impurities in the container are much increased, on the other hand, with a higher degree of vacuum under $10^{-5}$ torr, increased time and a large energy are needed to discharge the air in the container.

Once the air inside the container has been evacuated, the container is subsequently filled or "charged" with a raw gas that will be used in the formation of the carbon coating 26. The flow rate of the raw gas is preferably within a range from about 1 to 100 ml/min. Preferably, the diffusion of the raw gas within the container is enhanced by providing an extension, such as a tube having a plurality of blow openings. In accordance with one embodiment, an extension enters inside of the container 10 through the second aperture some time after the opening 13 is sealed and the extension extends to within about 25.4 mm to 50.8 mm (1.0 in.–2.0 in.) of the lowermost portion of the container.

The raw gas may be comprised of aliphatic hydrocarbons, aromatic hydrocarbons, oxygen containing hydrocarbons, nitrogen containing hydrocarbons, etc., in gaseous or liquid state at a room temperature. Benzene, toluene, o-xylene, m-xylene, p-xylene and cyclohexane each having six or more than six carbons are preferable. The raw gases may be used singularly, but a mixture of two or more than two kinds of raw gases can also be used. Moreover, the raw gases may be used in the state of dilution with inert gas such as argon and helium.

At some point after the container has been received by the receiving mechanism of the carbon-coating apparatus, the container is inserted into a cylinder or other hollow space provided to accommodate the container. In the preferred embodiment, the carbon-coating apparatus includes a plurality of hollow cylinders that rotate in the same direction as, and in synchronization with, the receiving mechanism. It is further preferred that the receiving mechanism that retains and seals the opening 13 of the container also functions to cover the cylinder.

After the supply of the raw gas into the container, energy is impressed upon the container from a high frequency electric energy source, such as a microwave-producing device. The impression of the electric power generates plasma, and causes extreme molecular excitation ionization and a carbon coating 26 to be formed on the inner surface 22 of the container.

While the foregoing method illustrates one process for forming a carbon coating 26 on the inner surface 22 of a container, other conventional methods can also be used successfully. For instance, the plastic container could instead be inserted and accommodated within an external electrode and have an internal electrode positioned within the container. After the container is evacuated and is charged with raw gas supplied through the internal electrode, electric power is supplied from the high frequency electric source to the external electrode. The supply of electric power generates plasma between the external electrode and the internal electrode. Because the internal electrode is earthed, and the external electrode is insulated by the insulating member, a negative self-bias is generated on the external electrode, so that carbon film is formed uniformly on the inner surface of the container along the external electrode.

When the plasma is generated between the external electrode and the internal electrode, electrons are accumulated on the inner surface of the insulated external electrode to electrify negatively the external electrode, to generate negative self-bias on the external electrode. At the external electrode, a voltage drop occurs because of the accumulated electrons. At this time, carbon dioxide as the carbon resource exists in the plasma, and positively ionized carbon resource gas is selectively collided with the inner surface 22 of the container which is disposed along the external electrode, and, then, carbons close to each other are bonded together thereby to form hard carbon film comprising remarkably dense coating on the inner surface 22 of the container.

The thickness and uniformity of the carbon coating 26 can be varied by adjusting the output of high frequency; the pressure of the raw gas in the container; the flow rate for charging the container with gas; the period of time during which plasma is generated; the self-bias and kind of raw materials used; and other like variables. However, the thickness of the carbon coating 26 is preferably within a range from 0.05 to 10 $\mu$m to obtain the effective suppression of the permeation and/or absorption of the low molecular organic compound and the improved gas barrier property, in addition to an excellent adhesion to plastic, a good durability and a good transparency.

Figure 4:
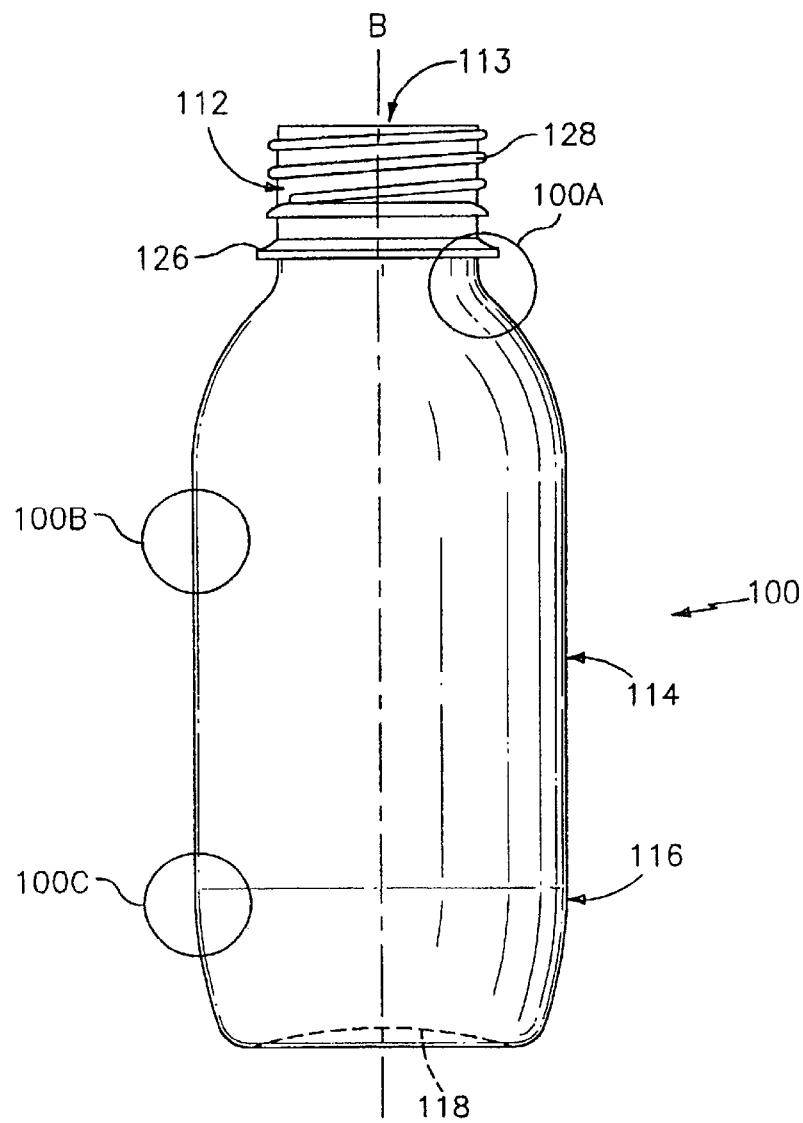
FIG. 4 is an elevation view of a container in accordance with the principles of the present invention.

FIG. 4 shows an elevational view of a further embodiment of a container 100 constructed in accordance with the principles of the present invention. Container 100 typically includes an upper wall portion 112, including an opening 113; an intermediate sidewall portion 114 positioning beneath the upper wall portion 112; and a base portion 116 positioned beneath the intermediate sidewall portion 114. The base portion 116 is adapted to support the container 100 either dependently, i.e., where another object such as a base cup (not shown) is used, or independently, i.e., where no other objects are needed to stand the container upright on a generally flat surface. In a preferred embodiment, the container 100 is supported by a freestanding base formed by an internal depression 118, such as illustrated in FIG. 4.

Figure 5:
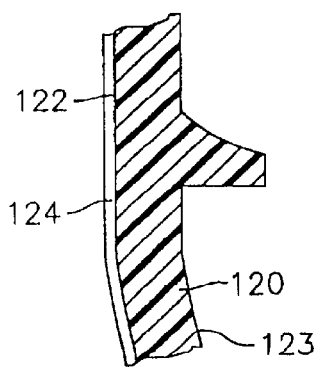
FIGS. 5, 6 and 7 are cross-sectional and enlarged views of various areas of the container wherein the relative thicknesses of the layers forming the container are illustrated.
Figure 6:
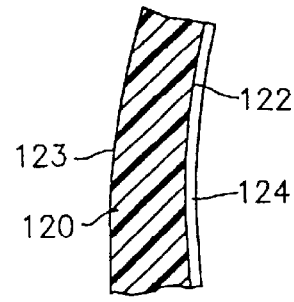
Figure 7:
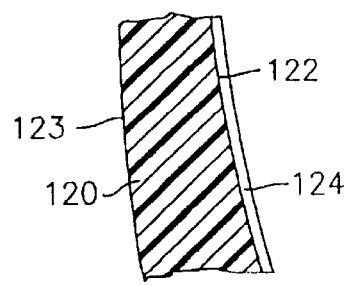

Referring to FIGS. 5–7, which represent enlarged detailed views of areas 100A, 100B and 100C, respectively, of FIG. 4, the container 100 includes a molded outer layer 120, having a vertical length, an inner surface 122, an outer surface 123 and a central vertical axis B. The inner surface 122 of the molded outer layer 120 is at least partially coated with a thin layer or film of carbon 124 as in the embodiments of FIGS. 1–3. While complete encapsulation of the inner layer 120 by the carbon layer 124 is preferred, it may not be required for particular applications. It is preferred that the molded outer layer 120 is substantially coextensive with the carbon layer 124 and provide structural support for the container 100.

The molded outer layer 120 is the desirable HDPE plastic material, although it may contain other materials therein as described above. If desired, the molded outer layer may be 100% HDPE plastic material.

It is particularly desirable to blend small amounts of barrier materials and/or oxygen scavenging or reacting materials with the HDPE as discussed with respect to FIG. 1. For example, less than 5% by weight of saran, ethylene vinyl alcohol copolymers (EVOH) and acrylonitrile copolymers, such as Barex. In addition, the present invention can readily use ultra low intrinsic viscosity (IV) material, e.g., material having an IV of less than around 0.60 or 0.55. These materials are frequently white or whitish in color. A significant advantage of the present invention is ability to process in-process scrap simply and efficiently, even with materials as aforesaid.

The inner surface 122 of the outer layer 120 is coated with a thin layer of carbon 124 which provides enhanced barrier properties to the container 100. Features of, characteristics of and preparation of the carbon coating 124 has been described above with respect to FIG. 1 and this applies also to the embodiments of FIGS. 4–7.

The molded outer layer 120 has a wall thickness, taken along its vertical length, that is in the range of 6 to 23 mils (0.1524 mm to 0.5842 mm). As illustrated in FIGS. 5–7, the thickness of the outer layer can also be separately and independently varied along its vertical length, as with outer layer 24 of FIG. 1. In the same manner as outer layer 24 of FIG. 1, because the molded outer layer 120 is comprised of a less expensive and desirable HDPE plastic material that does not directly contact the contents of the container 100, a less expensive material can be used to form the bulk of the container including a number of the structural integral components for the container, such as the neck flange 126 and outer threads 128 shown in FIG. 4. The carbon coating provides protection for the container contents.

Similarly, the inner carbon coating can be readily varied so that the thickness thereof varies along the vertical length of the container. Desirably, however, for convenience a substantially uniform carbon coating is provided.

The embodiments of FIGS. 4–7 offer the significant advantages of the present invention described with respect to FIGS. 1–3.

The container of FIGS. 4–7 may be formed by any of several known processing techniques which permit the manufacture of a single layer or multi-layer molded container as described for FIG. 1. In one embodiment, the container 100 is formed via a blow molding or extrusion molding operation. Container 130, such as the one generally depicted in FIG. 8, may be the final extrusion molded container or a preform. Although not a required feature, a neck flange 132 may be provided (for handling purposes) and outer threads 134 (to secure a closure) that corresponds to the same features shown in FIG. 4. If blow molding is employed, after the blow molding of the container to form the final container 100 an embodiment of which is shown in FIG. 4, but some time before the filling operation, the inner surface 122 of the container is carbon-treated as further discussed above.

Figure 9:
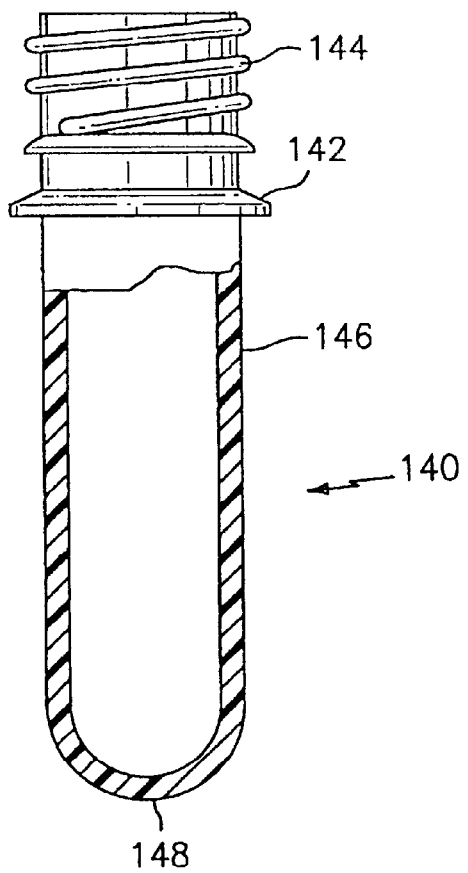
FIG. 9 is a partially broken away elevation view of another example of a preform.

In one embodiment shown in FIG. 9, a preform 140 which will become the container is produced by extrusion molding a preform or final container 140 with a body 146 and a base 148, neck flange 142 and outer threads 144. An extrusion process permits the manufacturer to readily vary the thickness of material being extruded along the length of the extrudate. Variations in the thickness of the preform is desirable for several reasons which include aesthetics, efficient material use and reduced costs, and variable strength requirements.

Container or preform 140 is based on HDPE plastic material which, as indicated hereinabove is a particular advantage of the present invention.

Figure 8:
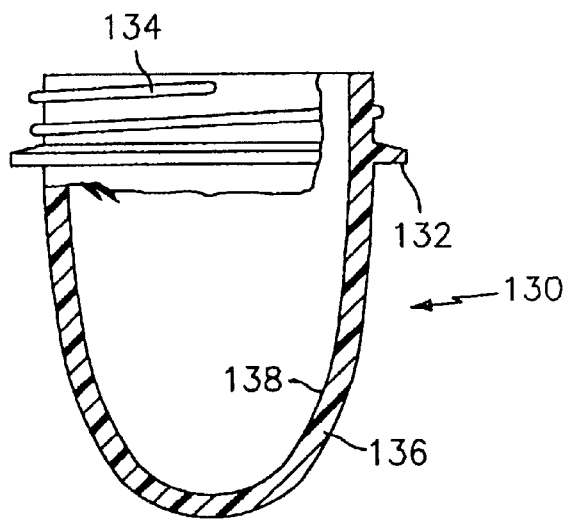
FIG. 8 is a partially broken away elevation view of one example of a preform.

In the embodiment of FIG. 8, a preform or final container 130 is produced by thermoforming a thin sheet of plastic material and forming that sheet into what will become the preform 130, or injection or compression molding the preform 130. Thus, preform 130 of FIG. 8 may include a neck flange 132 and outer threads 134, body portion 136 which will become the container body portion and base portion 138 which will become the container base portion.

The container can then be blown if desired using conventional blow molding operations as described above.

After the final container is formed, a carbon coating is formed on at least a portion of the inner surface 122 of the container 120 and preferably on the entire inner surface, as described above for FIG. 1. The carbon coating 124 does not have to be immediately applied to the container, however, it is generally more efficient to apply the carbon coating promptly after the intermediate container has been blown and is within an appropriate temperature profile.

The container of FIG. 4 offers significant advantages in addition to those of FIG. 1. The base container is a mono-layer material that can be readily processed by conventional means. Moreover, the inexpensive HDPE base material can be readily admixed with other materials and due to the inner carbon coating does not contact the container contents and the contents are well protected. Barrier properties are readily and easily obtained and the container contents are not impacted by adverse aromas or taste. Further, the container of the present invention eliminates the need for a separate barrier liner or a virgin liner. The small amount of inner carbon coating dos not adversely affect recycling, and colored materials can be readily used to provide a desirably colored container, for example, the outer layer can be easily colored in a desirable commercial color.

The container of FIG. 4 offers the significant advantages of a mono-layer container with desirable engineered properties, as barrier resistance and low cost. Thus, processing is significantly easier than with multi-layer containers since one is working with a mono-layer material without the necessity for the use of liners and complicated coinjection processing. Further, one can blend the recycled plastic with other materials to readily obtain special properties while still retaining the use of desirably low cost recycled plastic. For example, one could customize the product in order to obtain desirable characteristics while still using recycled material and a mono-layer material.

The internal carbon coating is simply and conveniently applied and is quite thin and yet precludes the migration of adverse flavors and taste into the contents of the container. It is particularly desirable to use a variety of colors for the HDPE plastic as for example an amber color. It would be highly desirable to use such a container as in the present invention with a tailored color and for a juice product. As a still further alternative, one could blend heat resistant plastic or other materials with the HDPE to obtain highly desirable characteristics.

Although certain preferred embodiments of the present invention have been described, the invention is not limited to the illustrations described and shown herein, which are deemed to be merely illustrative of the best modes of carrying out the invention. A person or ordinary skill in the art will realize that certain alternatives, modifications, and variations will come within the teachings of this invention and that such alternatives, modifications, and variations are within the spirit and the broad scope of the appended claims.

What is claimed is:

1. A molded container including an upper wall portion having an opening, an intermediate sidewall portion positioned beneath the upper wall portion, and a base portion positioned beneath the intermediate sidewall portion and connected to support the container, said container further comprising: a molded first layer having an inner surface and an outer surface and formed front high density polyethylene; a carbon coating formed adjacent the inner surface of the first layer and adhered thereto and substantially coextensive with the first layer, wherein said carbon coating has a thickness less than about 10 microns, wherein said container can be recycled, wherein the carbon coating has a thickness that varies along the vertical length of the container, and the thickness of the inner carbon layer is independently, controllably varied with respect to the outer layer.

2. A container according to claim 1, wherein said container is one of extrusion molded and blow molded.

3. A container according to claim 1, wherein said first layer has a thickness from 6 to 23 mils, and wherein the carbon coating has a thickness of 0.05 to 10 microns.

4. A container according to claim 1, wherein the thickness of the first layer varies so that the intermediate sidewall portion is thinner than the upper wall portion and the base portion.

5. A container according to claim 1, including a barrier material added to the first layer.

6. A container according to claim 1, wherein the carbon is coated on the inner surface of the container from at least one gaseous hydrocarbon.

7. A container according to claim 1, wherein the carbon coating is amorphous.

8. A container according to claim 7, wherein the carbon coating is an amorphous carbon that is doped with nitrogen.

9. A container according to claim 1, including at least one of the upper portion of the container including a support flange, and the base portion includes an inwardly directed portion.

10. A container according to claim 1, wherein the first layer is colored.

11. A container according to claim 1, for non-carbonated beverages.

12. A container according to claim 1, wherein the first layer contains an oxygen-scavenging material.

13. A container according to claim 1, including a second layer adjacent the first layer, wherein said second layer is adjacent at least one of the inner surface of the first layer and the outer surface of the first layer.

14. A container according to claim 13, wherein the second layer is formed from a plastic material comprised of a resin selected from the group consisting of polyethylene resin, polypropylene resin, polystyrene resin, cycloolefine copolymer resin, polyethylene terephthalate resin, polyethylene naphthalate resin, ethylene-(vinyl alcohol) copolymer resin, poly-4-methylpentene-1 resin, poly(methyl methacrylate) resin, acrylonitrile resin, polyvinyl chloride resin, polyvinylidene chloride resin, styrene-acrylo nitrile resin, acrylonitrile-butadiene-styrene resin, polyamide resin, polyamideimide resin, polyacetalresin, polycarbonate resin, polybutylene terephthalate resin, ionomer resin, polysulfone resin, polytetra-fluoroethylene resin, and combinations of two or more of such resins.

15. A container according to claim 13, wherein at least one of the first layer and the second layer has a thickness that varies along its vertical length.

16. A container according to claim 13, wherein the thickness of the first layer and second layer are controllably varied with respect to one another.

17. A container according to claim 13, wherein the second layer is adjacent the inner surface of the first layer and has a thickness of from 0.5 to 5 mils.

18. A container according to claim 17, wherein the second layer comprises less than 0.60 by weight of the total weight of the container.

19. A container according to claim 18, wherein the second layer comprises less than 0.30 by weight of the total weight of the container.

20. A container according to claim 18, wherein the second layer comprises less than 0.15 by weight of the total weight of the container.

21. A container according to claim 1, wherein the thickness of the carbon coating is less than 10 $\mu$m and the weight of the carbon coating is less than about $1/10,000^{th}$ of the total weight of the container.

22. A container according to claim 1, wherein the high density polyethylene has a density above about 0.940 grams/cc.

23. A container according to claim 1, wherein the high density polyethylene is at least 0.40 by weight of the total weight of the container.

24. A container according to claim 23, wherein the high density polyethylene is more than 0.90 by weight of the total weight of the container.

25. A container according to claim 1, wherein the high density polyethylene does not directly contact the contents of the container.

26. A container according to claim 1, wherein the first layer has a thickness of at least 6 mils.

27. A container according to claim 1, wherein the first layer contains recycled material.

28. A container according to claim 13, wherein the first layer contains recycled material.

* * * * *